Jan. 5, 1960 R. BEAGLES ET AL 2,920,284
SIGNAL GENERATOR HAVING INDEPENDENT OUTPUT FREQUENCY AND PHASE ADJUSTMENT MEANS
Filed Jan. 10, 1955 2 Sheets-Sheet 1

INVENTORS.
ROBERT BEAGLES
VIRGIL W. WALL
BY
William R. Lane
ATTORNEY

INVENTORS.
ROBERT BEAGLES
VIRGIL W. WALL
BY William R. Lane
ATTORNEY

United States Patent Office 2,920,284

Patented Jan. 5, 1960

2,920,284

SIGNAL GENERATOR HAVING INDEPENDENT OUTPUT FREQUENCY AND PHASE ADJUSTMENT MEANS

Robert Beagles, Pacific Palisades, and Virgil W. Wall, Downey, Calif., assignors to North American Aviation, Inc.

Application January 10, 1955, Serial No. 480,782

4 Claims. (Cl. 331—38)

This invention relates to signal generators and particularly to a signal generator capable of producing two or more output signals of the same but variable frequency and having predetermined and variable phase relationships and in which a change in the frequency of the output signals does not affect the phase relationship between the signals.

In order to calibrate and tune certain types of radars, particularly the intermediate frequency stages, it is desirable to have a source of high frequency signals at least two of which have a predetermined phase relationship. It is further desirable that this source be capable of producing output signals of adjustable frequencies and that a change in the frequency of the output signals does not affect the relative phase relationships between the signals. Thus if the radar has two intermediate frequency channels which under normal operating conditions are subjected to high frequency signals with a predetermined phase relationship, and it is desired to maintain this phase relationship through the intermediate frequency stages despite rather broad deviations in frequency from some central or mean frequency, the signal generator of this invention can be used to duplicate the operational inputs to thereby permit the accurate tuning of the intermediate stages by methods well-known to those skilled in the art.

It is, therefore, an object of this invention to provide a signal generator producing an output whose phase is substantially independent of changes in frequency.

It is another object of this invention to provide a signal generator having at least two output signals of adjustable frequency and of adjustable relative phase relationship.

It is a further object of this invention to provide a signal generator having multiple signal outputs in which the phase adjustment and output frequency adjustment are independent.

It is another object of this invention to provide a signal generator utilizing a source of constant frequency signals, a plurality of phase shifter means adapted to shift the phase of the signals predetermined amounts, a second source of oscillatory signals of adjustable frequency, and a plurality of mixer means connected to individually mix the signals from the phase shifter means with the signals from the second source.

Figure 1:
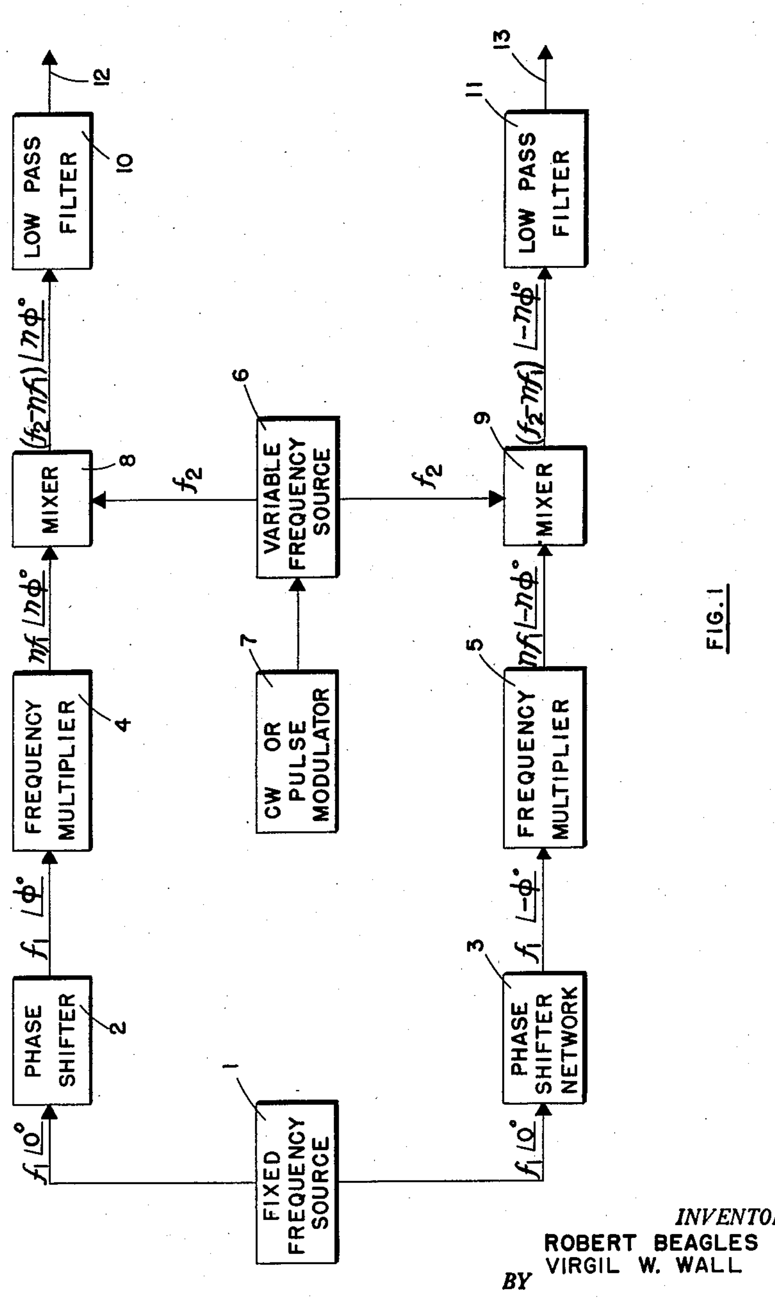
Figure 2:
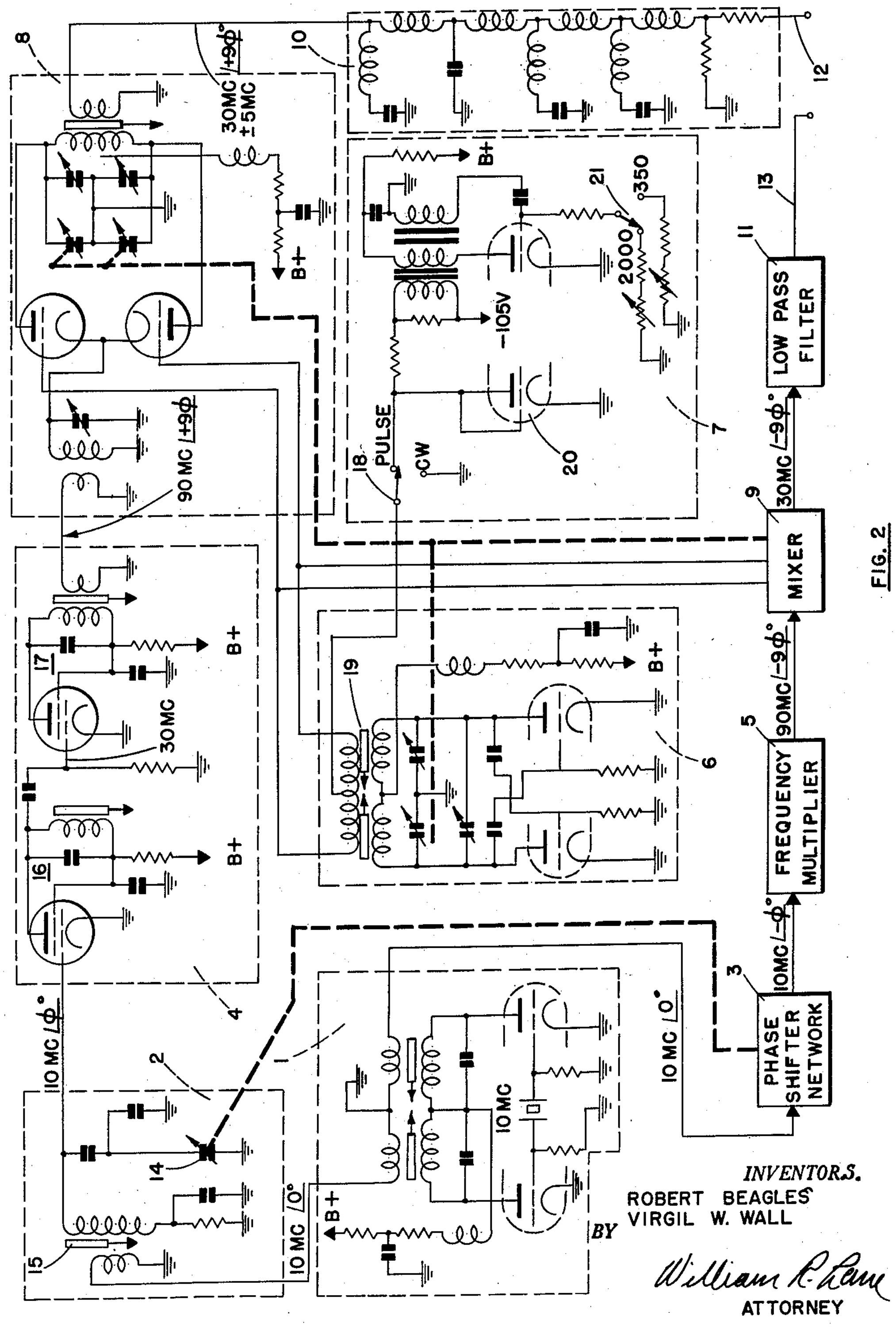

Other objects of invention will become apparent from the following description taken in connection with the accompanying drawings, in which Fig. 1 is a block diagram of a preferred embodiment of the signal generator contemplated by this invention; and Fig. 2 is a diagram partly schematic of the circuit utilized in the signal generator of Fig. 1.

Referring now to Fig. 1, a block diagram of a preferred embodiment of the signal generator contemplated by this invention is shown. Fixed frequency source 1, which may be a crystal-controlled, tuned-plate oscillator, produces oscillatory signals at a fixed frequency, $f_1$. These output signals are coupled to phase shifter networks 2 and 3. Networks 2 and 3 produce output signals which differ in phase from their input signals by predetermined and variable phase angles $\phi$ and $-\phi$, respectively. The outputs of networks 2 and 3 are coupled into frequency multipliers 4 and 5, respectively. Frequency multipliers 4 and 5 consist of a plurality of conventional frequency doubler or tripler circuits connected in series to produce output signals having frequencies $n$ times the frequencies of the input signals. It is to be noted that the relative phase angle also is effectively increased by a factor of $n$. Therefore, the output signals from frequency multipliers 4 and 5 have frequencies and phase angles of $nf_1\angle n\phi°$ and $nf_1\angle -n\phi°$.

Variable frequency source 6 provides either pulsed or continuous wave oscillatory signals at an adjustable frequency, $f_2$. A switch in CW or pulse modulator 7 selects the type of output wave form from the signal generator. Mixers 8 and 9 are subjected to the signals from multipliers 4 and 5 respectively as well as the signals from source 6. Mixers 8 and 9 are tuned to the difference frequency of their two inputs. The phase relationship of the outputs of the heterodyne mixer is directly a function of the phase relationship of the inputs regardless of the frequency conversion. Therefore, the frequencies and the phase angles of the output signals from mixers 8 and 9 are $(f_2-nf_1)\ \angle n\phi°$ and $(f_2-nf_1)\ \angle -n\phi°$ respectively. Since these outputs have heavy harmonic content, low pass filters 10 and 11 are provided to filter out the harmonics. Substantially sinusoidal oscillatory signals are thereby provided through output channels 12 and 13. It is to be noted that the outputs have the same frequency and that the relative phase relationship between the two outputs is equivalent to $2n\phi°$. A change in output frequency, accomplished by adjusting the frequency of source 6, does not affect the phase relationship between the signals in channels 12 and 13. Further, a change in the output phase relationship, accomplished by adjusting phase networks 2 and 3, does not affect the frequency of the output signals.

Referring now to Fig. 2, a diagram, partly schematic, of the signal generator of Fig. 1 is shown. Assume that two oscillatory signals of the same frequency are desired in output channels 12 and 13. The frequency of these signals is to be adjustable, within limits, such as between 25 and 35 megacycles. The relative phase angle between the two signals is also made adjustable over the entire range of from 0° to 360°. Further provision is made to generate either continuous wave (CW) or pulsed signals. For purposes of illustration, the diagram shows a detailed schematic of the circuit utilized to produce output signals in channel 12, it being understood that the circuit utilized to produce output signals in channel 13 is similarly constructed.

Fixed frequency source 1 is preferably a crystal-controlled oscillator designed to generate signals of 10 megacycles. These signals are individually inductively coupled to phase shifters 2 and 3. Phase shifter 2 is substantially a tuned series RLC network which includes a variable capacitor. Variable capacitor 14 changes the tuning of the series circuit and therefore, assuming a constant frequency input through transformer 15, changes the phase angle of the signal which appears across the capacitors. As will appear later, in order to obtain a 360° range of phase variation, phase shifters 2 and 3 must each be capable of changing the phase angle of their inputs over a range of 20°. This is easily accomplished by the circuit shown. Assume for a given setting of capacitor 14 that the output signal is shifted to angle $+\phi°$, with respect to the input signal. Phase shifter 3 operates in a similar manner preferably shifting the phase of the input signal by an angle, $-\phi°$. The two variable capacitors of phase shifters 2 and 3 are ganged together in a manner to cause them to change the phase of the input signals by equal amounts but in opposite directions.

Frequency multipliers 4 and 5 utilize two frequency tripler circuits connected in series. Thus in multiplier 4, the plate tank of tripler 16 is tuned to the third harmonic of the input signal or to 30 megacycles. Similarly, the plate tank of tripler 17 is tuned to the third harmonic of the 30 megacycle input or to 90 megacycles. Frequency multiplier 5 is constructed in a similar manner. Frequency multipliers 4 and 5 therefore produce signals having a frequency of 90 megacycles. It is also to be noted that the phase angle of the signals also is multiplied by a factor of 9. Thus, the signals from multiplier 4 are at a frequency of 90 megacycles and a phase angle of $+9\phi°$ while the signals from multiplier 5 are at a frequency of 90 megacycles and a phase angle of $-9\phi°$. It is to be noted that the relative phase angle between the two signals is $18\phi°$. From this it can readily be seen that $\phi$, the phase shift accomplished by each phase shifter, need only be 20° in order to generate a total 360° relative phase angle between the two signals.

Variable frequency oscillator 6 is provided to generate signals of a variable frequency. The frequency of the signals from oscillator 6 is varied by adjusting the capacitors in the tuned plate circuit to thereby change the resonant frequency. For purposes of illustration, the output frequency from oscillator 6 is made adjustable from 55 to 65 megacycles. Mixers 8 and 9 are provided to heterodyne the signals from frequency multipliers 4 and 5, respectively, with the signals from oscillator 6. Thus, the 90 megacycle signals from multiplier 4 are coupled to the common cathode of the push-pull triodes of mixer 8. The signals from oscillator 6 are coupled to the grids of the triodes in mixer 8. The plate tank of mixer 8 is tuned to the difference frequency between the two input signals. Mixer 9 is similarly constructed. It is to be noted that the variable capacitors in the tuned tank circuit of mixers 8 and 9 are mechanically ganged to the tuning capacitors of oscillator 6. This insures that the tank circuits are tuned to the proper difference frequency. Thus if, in the assumed example, oscillator 6 generates 55 megacycle signals, the mixer plate is tuned to 35 megacycles. Similarly, if oscillator 6 generates 65 megacycle signals, the plate tank circuit is tuned to 25 megacycles.

It is to be noted that mixers 8 and 9 do not affect the relative phase angle of the two signals. Thus the output from mixer 8 is between 25 and 35 megacycles with a phase angle of $+9\phi°$ while the output from mixer 9 is at the same frequency but with a phase angle of $-9\phi°$.

These output signals have strong harmonic components. Low pass filters 10 and 11 effectively filter out these harmonics, leaving the desired fundamental. These filters are of conventional design and need not be further described here. Thus the signals appearing at channel 13 are made readily adjustable both in frequency and in phase angle with respect to the signals appearing at channel 14. It is to be noted that a change in frequency, accomplished by the adjustment to oscillator 6 does not in any manner affect the phase angle between the two outputs and that tuning of the tank circuits of mixers 8 and 9 has a negligible effect upon phase angle between the two outputs when they are made broadbanded and/or made to track over the tuning range. Similarly a change in the pase angle accomplished by adjustments to phase shifters 2 and 3 does not in any manner affect the frequency of the outputs.

Modulator 7 is provided to alternatively provide for either continuous wave or pulsed output signals at channels 12 and 13. When switch 18 is in the CW position, the center tap on the secondary of transformer 19 is grounded thereby subjecting the grids of the triodes to the oscillatory output from oscillator 6. When switch 18 is in the pulse position, the center tap of the secondary of transformer 19 is normally biased far below the cutoff potential of the triodes in the mixers. However, periodically this biasing voltage is removed by pulses through tube 20. The timing of these pulses is determined by the circuit components in the grid circuit. As shown in Fig. 2, switch 21 is connected to select one of two possible pulse repetition frequencies.

Although the example of Figs. 1 and 2 and described above indicates the production of two output signals of the same frequency but of different phase angles, it is readily apparent that three or more output signals having any desired arrangement of relative phase angles could readily be designed. Further, it is readily apparent that other types of oscillators, multipliers, mixers, filters, and phase shifters could readily be used to accomplish the desired result.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A signal generator having variable frequency outputs of adjustable frequency with variable phase relationships comprising a source of constant frequency having a plurality of outputs, a plurality of variable phase shifter means individually connected to each of said outputs and adapted to shift the phases of said outputs predetermined adjustable amounts, a source of adjustable frequency having a plurality of outputs, and a plurality of mixer means individually connected to mix the outputs of said phase shifter means with the outputs of said adjustable frequency source and individually tuned to the difference frequencies between the outputs of said phase shifter means and the outputs of said adjustable frequency source whereby the frequency of the outputs from said mixer means is adjustable without affecting the phase relationship of said output and the phase relationship of the outputs of said mixer means is adjustable without affecting the frequency of the outputs thereof.

2. A signal generator for producing two output signals of adjustable frequency and phase relationship comprising a source of constant frequency signals, two phase shifter networks individually subjected to said constant frequency signals and adapted to adjustably shift the phase of said signals, a source of oscillatory signals of adjustable frequency, mixer means subjected to the signals from one of said phase shifter networks and from said second-named source and tuned to the difference frequency between said signals, and mixer means subjected to the signals from the other of said phase shifter network and from said second-named source and tuned to the difference frequency between said signals whereby the outputs of said mixer means are two oscillatory signals the frequency of which is varied by adjusting the frequency of the signals from said second-named source and the phase relationship of which is varied by adjusting the magnitude of the phase shift of said phase shifting networks.

3. In combination a first signal source of constant frequency signals, a pair of phase shifter networks individually subjected to said constant frequency signals for adjustably shifting the phase of said signals, a second signal source having a plurality of outputs of variable frequency, first and second mixing means, said first mixing means responsive to signals from one of said phase shifter networks and from said second signal source and tuned to the difference frequency between said signals, said second mixing means responsive to signals from the other of said phase shifter networks and from said second signal source and tuned to the difference frequency between said signals, whereby the frequency of the output signals from said mixer means varies with the frequency of the signals from said second source and the phase relationship between said output signals varies with the magnitude of the phase shift of said phase shifting networks.

4. In combination a source of constant frequency signals, a pair of phase shifters responsive to said source to produce a pair of signals of predetermined phase, a source of variable frequency signals, first mixer means responsive to one of said pair of signals of predetermined phase and signals from said variable frequency source and tuned to the difference frequency between said signals, and second mixer means responsive to the other of said pair of signals of predetermined phase and signals from said variable frequency source and tuned to said difference frequency.

References Cited in the file of this patent

UNITED STATES PATENTS

| | | |
|---|---|---|
| 2,205,469 | Curtis | June 25, 1940 |
| 2,624,041 | Evans | Dec. 30, 1952 |
| 2,635,226 | Harris | Apr. 14, 1953 |